United States Patent
Kerwick

(10) Patent No.: US 8,041,289 B2
(45) Date of Patent: Oct. 18, 2011

(54) INTERACTIVE BOOK WITH DETECTION OF LIFTED FLAPS

(76) Inventor: Michael E. Kerwick, Austin, TX (US)

(*) Notice: Subject to any disclaimer, the term of this patent is extended or adjusted under 35 U.S.C. 154(b) by 723 days.

(21) Appl. No.: 12/117,035

(22) Filed: May 8, 2008

(65) Prior Publication Data

US 2009/0280461 A1    Nov. 12, 2009

(51) Int. Cl.
*G09B 5/00* (2006.01)
(52) U.S. Cl. ............. 434/317; 434/308; 434/322
(58) Field of Classification Search .......... 434/317, 434/335, 311, 309, 118, 169, 308; 345/173, 345/169; 235/337, 181, 375; 281/50
See application file for complete search history.

(56) References Cited

U.S. PATENT DOCUMENTS

| | | | |
|---|---|---|---|
| 3,086,297 A | 4/1963 | Kay | |
| 3,220,126 A | 11/1965 | David | |
| 3,529,832 A | 9/1970 | Goetz et al. | |
| 3,668,692 A * | 6/1972 | Englund et al. | 341/13 |
| 4,636,881 A * | 1/1987 | Brefka et al. | 360/74.1 |
| 4,809,246 A | 2/1989 | Jeng | |
| 4,855,725 A | 8/1989 | Fernandez | |
| 4,884,974 A | 12/1989 | DeSmet | |
| 5,520,544 A * | 5/1996 | Manico et al. | 434/317 |
| 5,575,659 A | 11/1996 | King et al. | |
| 5,577,918 A * | 11/1996 | Crowell | 434/319 |
| 5,597,183 A | 1/1997 | Johnson | |
| 5,749,735 A | 5/1998 | Redford et al. | |
| 5,877,458 A | 3/1999 | Flowers | |
| 5,951,298 A | 9/1999 | Werzberger | |
| 6,052,717 A | 4/2000 | Reynolds et al. | |
| 6,517,407 B1 | 2/2003 | Peters | |
| 6,547,626 B1 | 4/2003 | Burrows | |
| 6,668,156 B2 | 12/2003 | Lynch et al. | |
| 6,748,402 B1 | 6/2004 | Reeves et al. | |
| 6,763,995 B1 | 7/2004 | Song | |
| 6,865,367 B2 | 3/2005 | Kim et al. | |
| 6,954,199 B2 * | 10/2005 | Soto et al. | 345/173 |
| 7,010,261 B2 | 3/2006 | Kim et al. | |
| 7,039,589 B2 | 5/2006 | Whitham | |
| 7,106,309 B2 | 9/2006 | Wood et al. | |
| 7,110,945 B2 | 9/2006 | Cogliano | |
| 7,111,774 B2 | 9/2006 | Song | |
| 7,120,386 B1 | 10/2006 | Lynch et al. | |
| 7,136,819 B2 | 11/2006 | Whitham | |
| 7,139,523 B1 | 11/2006 | Lynch et al. | |
| 7,167,675 B2 * | 1/2007 | Lynch et al. | 434/317 |
| 7,201,317 B2 | 4/2007 | Song | |
| 7,203,455 B2 | 4/2007 | Ernst et al. | |

(Continued)

*Primary Examiner* — Xuan Thai
*Assistant Examiner* — Kang Hu
(74) *Attorney, Agent, or Firm* — Meyertons Hood Kivlin Kowert & Goetzel, P.C.; Jeffrey C. Hood; Joel L. Stevens

(57) ABSTRACT

An interactive system for providing multimedia data in response to interaction with lift-the-flap elements. The system may include a housing which forms a substantially planar surface configured to support at least one printed media sheet. The printed sheet may include at least one lift-the-flap element. The system may further include a playback device configured to provide multimedia data relating to the lift-the-flap element. The system may include a detector which is configured to detect a position of the lift-the-flap element and provide position information. The system may further include a processing unit configured to cause playback of the multimedia data via the playback device based on the position information provided by the detector.

21 Claims, 9 Drawing Sheets

U.S. PATENT DOCUMENTS

| | | |
|---|---|---|
| 7,261,612 B1 | 8/2007 | Hannigan et al. |
| 7,366,664 B2 | 4/2008 | Cogliano |
| 2003/0162160 A1* | 8/2003 | Horchler et al. .............. 434/406 |
| 2006/0029921 A1* | 2/2006 | Walther et al. ................ 434/382 |
| 2008/0032276 A1* | 2/2008 | Zheng ........................... 434/317 |
| 2008/0145823 A1* | 6/2008 | Shuler et al. .................. 434/159 |

* cited by examiner

INTERACTIVE BOOK WITH DETECTION OF LIFTED FLAPS

FIELD OF THE INVENTION

The present invention relates to the field of interactive books, and more particularly to an interactive book with detection of lifted flap or pop-up elements.

DESCRIPTION OF THE RELATED ART

In recent years, in part due to the continuing decrease in cost of electronics and circuit production, interactive books have become popular. For example, such interactive books may allow a child or infant to interact with printed material, e.g., by providing multimedia playback while turning the page, pressing on elements in the pages, etc. Early examples of such interactive books include U.S. Pat. No. 3,086,297 which teaches a Talking Book based on coupling a book's pages to a phonograph mechanism and U.S. Pat. No. 3,220,126 which teaches a page indexing mechanism which can be used to detect which page of a book is open and control a phonograph or audio tape player in response. Also included in this field are audio recordings which contain audible cues intended to allow readers to turn pages of a book in synchronization with the recording. Later developments relate to systems that utilize electronic sensors to detect which page of a book is open, and which play associated audio outputs in response.

There are known print media books which contain flap elements that may be rotated along a formed seam such that the flaps stand out from the surface of book pages when lifted. Such books are commonly referred to as "lift-the-flap" books, "lift-a-flap" books, or simply "flap-books." Additionally, there are known print media books which contain folded elements that "pop up" when the book page in opened. Such books are commonly referred to as "pop-up" books. These flap and pop-up books are commonly used for children's entertainment and education, specifically for children in the age group of 2-5 years old.

However, current interactive books do not allow for interactivity in books which extend out from the page. Accordingly, improvement in interactive books are desired.

SUMMARY OF THE INVENTION

Various embodiments are presented of a method for detecting lift-the-flap elements in an interactive system and for producing multimedia output which correspond to the elements.

In one embodiment, the interactive system may include a housing which forms a substantially planar surface configured to support at least one printed media sheet. The at least one printed media sheet may include at least one lift-the-flap element. The printed media sheet may include a surface under the at least one lift-the-flap element. The surface under the element may include an image and/or text.

In some embodiments, the at least one printed media sheet may be a plurality of media sheets and may compose an interactive book. Each media sheet of the plurality of media sheets may include a different identifier.

The interactive system may include a playback device configured to provide multimedia data relating to the at least one lift-the-flap element of the at least one printed media sheet. In some embodiments, the at least one lift-the-flap element may be a plurality of lift-the-flap elements. Correspondingly, the multimedia data may include multimedia data corresponding to each of the lift-the-flap elements. More specifically, the multimedia data may correspond to the text and/or image under the lift-the-flap element.

The interactive system may include a detector which is configured to detect a position of the at least one lift-the-flap element and provide position information. More specifically, the detector may be configured to provide a first indication of when the at least one lift-the-flap element is lifted. The detector may be further configured to provide a second indication of when the at least one lift-the-flap element is returned to a substantially planar orientation with respect to the at least one printed media sheet.

The detector may include an electromagnetic wave emitter and an electromagnetic wave sensor mounted in the housing such that a beam of electromagnetic energy (e.g., infrared (IR)) exists in a line from the emitter to the sensor and such that the beam is interrupted when the at least one lift-the-flap elements is moved to a lifted position. Accordingly, the detector may be configured to provide the position information based on beam interruption.

In embodiments where the at least one lift-the-flap element is a plurality of lift-the-flap elements, the detector may be configured to provide position information for each of the plurality of lift-the-flap elements. The detector may also provide identification information of the respective lift-the-flap element. For example, each lift-the-flap element may include a different aperture for identification, and the detector may be able to detect the different aperture and provide corresponding identification information.

In embodiments where the at least one printed media sheet comprises a plurality of media sheets, the detector (or a different detector) may be configured to detect the current sheet (and/or the identity of the current set of media sheets or book) and provide that information.

The interactive system may include a processing unit coupled to the playback device and the detector. The processing unit may be configured to cause playback of the multimedia data via the playback device based on the position information provided by the detector. More specifically, the processing unit may be configured to cause playback of the multimedia data via the playback device in response to the indication that the at least one lift-the-flap element is lifted. The processing unit may also be configured to cease playback of the multimedia data in response to the second indication that the lift-the-flap element has been returned to substantially planar position.

Where the at least one lift-the-flap element is a plurality of elements, the processing unit may be configured to cause playback of the respective multimedia data based on position information of the respective lift-the-flap element, e.g., using identification information of the lift-the-flap element provided by the detector.

In some embodiments, the interactive system may include a plurality of additional detectors, each configured to detect position of additional lift-the-flap elements. Accordingly, the processing logic may be configured to provide playback of different multimedia data for each respective lift-the-flap element via the playback device.

Where the at least one printed media sheet is a plurality of printed media sheets, the processing unit may be configured to cause playback of the respective multimedia data based on the identification of the printed media sheet. In other words, the playback of multimedia data may correspond to the lift-the-flap element of the identified printed media sheet.

In some embodiments, the multimedia data may include audio data, and the system may include a speaker coupled to the playback device for outputting the audio data. Similarly, the multimedia data may include video data, and the system may include a display coupled to the playback device for outputting the video data.

The method for operating the interactive system may include receiving first input indicating a current page of a plurality of pages. In some embodiments, the current page may include one or a plurality of lift-the-flap elements.

The method may further include receiving second input indicating that a lift-the-flap element of the current page has been lifted.

The second input may be received in response to detecting that the lift-the-flap element of the current page has been lifted. For example, detecting the lifting of the lift-the-flap element may include detecting that a beam of electromagnetic energy has been interrupted by the lift-the-flap element.

The method may include identifying the lift-the-flap element. Identification of the lift-the-flap element may use an aperture of the lift-the-flap element.

The method may further include providing playback of multimedia data based on said receiving the second input, wherein the playback of the multimedia data corresponds to the identified lift-the-flap element.

In one embodiment, the method may further include receiving third input indicating that a second lift-the-flap element of the current page has been lifted, identifying the second lift-the-flap element, and providing playback of second multimedia data based on the third input. The playback of the second multimedia data may correspond to the identified second lift-the-flap element.

Alternatively, or additionally, the method may include receiving third input indicating a second page of the plurality of pages, receiving fourth input indicating that a second lift-the-flap element of the second page has been lifted, identifying the second lift-the-flap element, and providing playback of second multimedia data based on said receiving the fourth input. The playback of the second multimedia data may correspond to the identified second lift-the-flap element.

Additionally, the interactive system may include a printed media sheet for an interactive system. The printed media sheet may include a printed media sheet identifier usable to identify the printed media sheet. The printed media sheet may further include one or more printed images and/or text displayed on the printed media sheet. The printed media sheet may also include a plurality of lift-the-flap elements. Each of the plurality of the lift-the-flap elements may include an identifier. The identifier may be usable to uniquely identify the lift-the-flap element for use in the interactive system.

The printed media sheet may include a plurality of areas under the lift-the-flap elements. Each of the areas under the lift-the-flap elements may include text and/or images corresponding to the respective lift-the-flap element.

As indicated above, the printed media sheet may be adapted to be included in the interactive system, such that, in response to an identification of the lift-the-flap element, the interactive system is operable to provide playback of corresponding multimedia data.

BRIEF DESCRIPTION OF THE DRAWINGS

A better understanding of the present invention can be obtained when the following detailed description of the preferred embodiment is considered in conjunction with the following drawings, in which.

Figure 1:
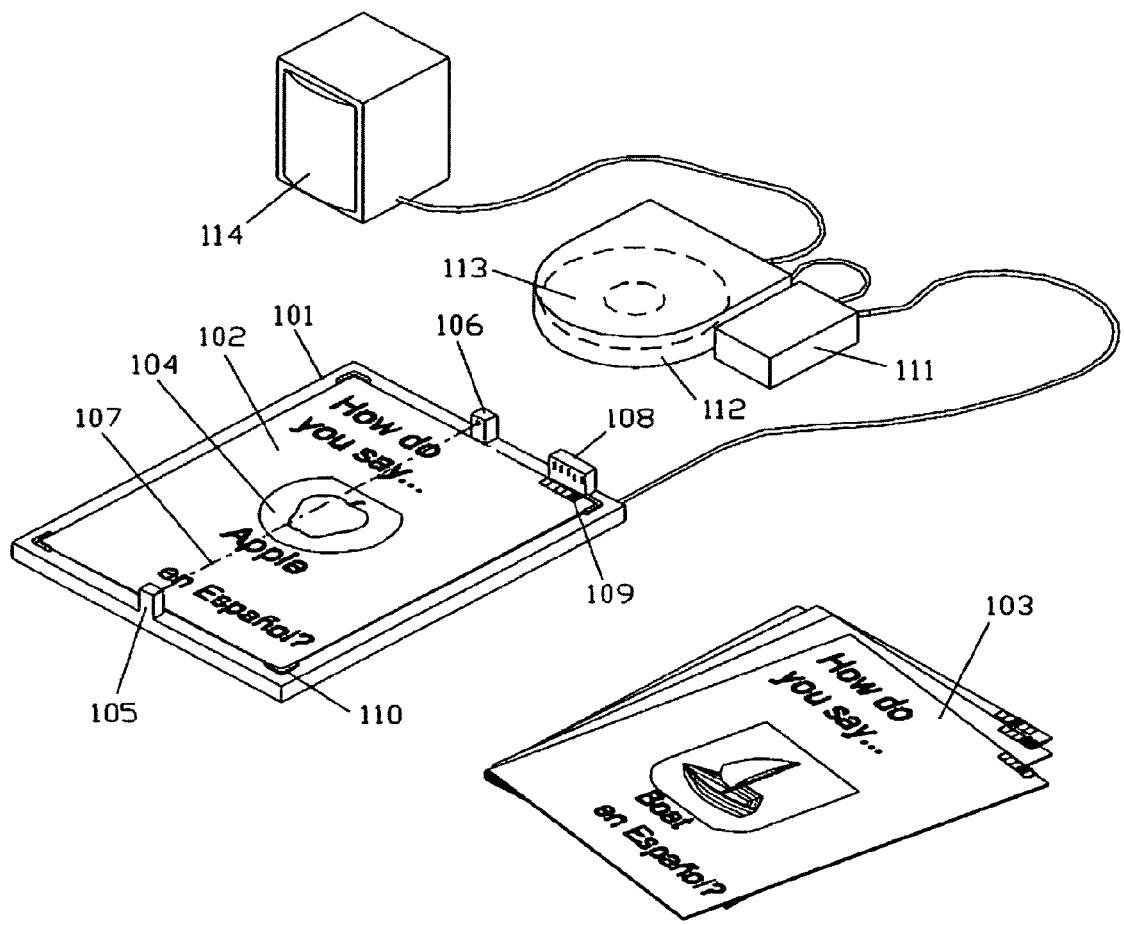
FIG. 1 illustrates an exemplary single sheet, single flap reader with the flap down, according to one embodiment.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Terms

The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; or a non-volatile memory such as a ROM, Flash Memory, magnetic media, e.g., a hard drive, or optical storage. The memory medium may comprise other types of memory as well, or combinations thereof. In addition, the memory medium may be located in a first computer or device in which the programs are executed, or may be located in a second different device which connects to the first device via an electrical or electromagnetic connection, or over a network, such as the Internet. In the latter instance, the second device may provide program instructions to the first device for execution. The term "memory medium" may include two or more memory mediums which may reside in different locations, e.g., in different computers that are connected over a network.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Processing Unit—any of various types of computing or processing systems, including a microcontroller, programmable logic device, ASIC, electronic logic circuit, personal computer system (PC), mainframe computer system, workstation, network appliance, Internet appliance, personal digital assistant (PDA), television system, grid computing system, or other device or combinations of devices. In general, the term "processing unit" can be broadly defined to encompass any device (or combination of devices) having at least one logic circuit that can produce a defined electronic output in response to stimuli.

Lift-the-Flap—refers to various structures which may extend in a three dimensional sense from a printed media sheet. For example, a lift-the-flap element may be attached to a printed media sheet, where, when the lift-the-flap element is down, it is parallel to the printed media sheet. The lift-the-flap element may be rotated along a formed seam such that the flap stands out from the surface of the sheet when lifted. Additionally, the lift-the-flap element may have printed text or images on the top portion which is viewable by a user when in the down position. When lifted, the lift-the-flap element may extend upwards from the printed media sheet. Accordingly, the lift-the-flap element's bottom portion may be displayed to a viewer, which was not previously visible. As another example, a lift-the-flap element may also refer to various pop up elements that form a three dimensional structure when manipulated, or which are mechanically coupled to the page of a book such that they automatically fold out into a three dimensional structure when the book is opened to that page.

Figure 2:
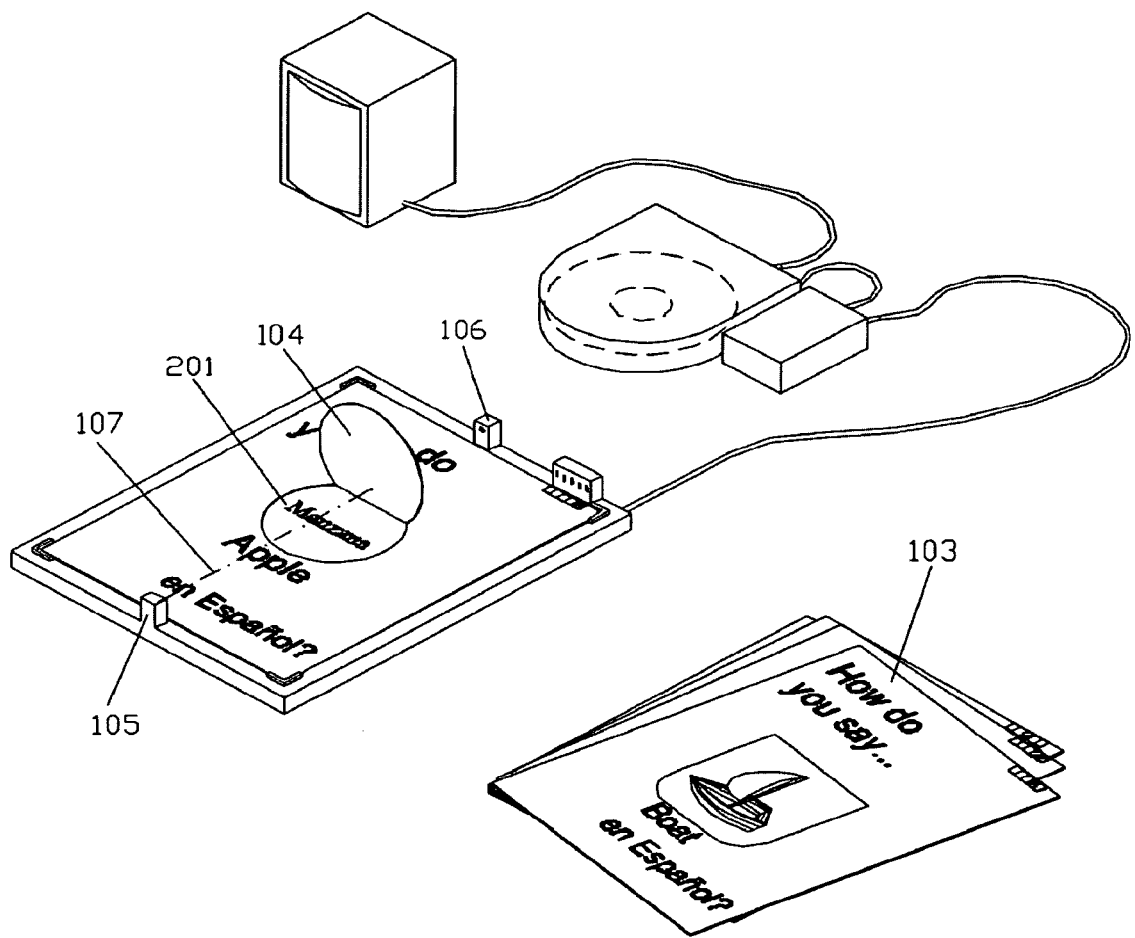
FIG. 2 illustrates an exemplary single sheet, single flap reader with the flap lifted or up, according to one embodiment.
Figure 3:
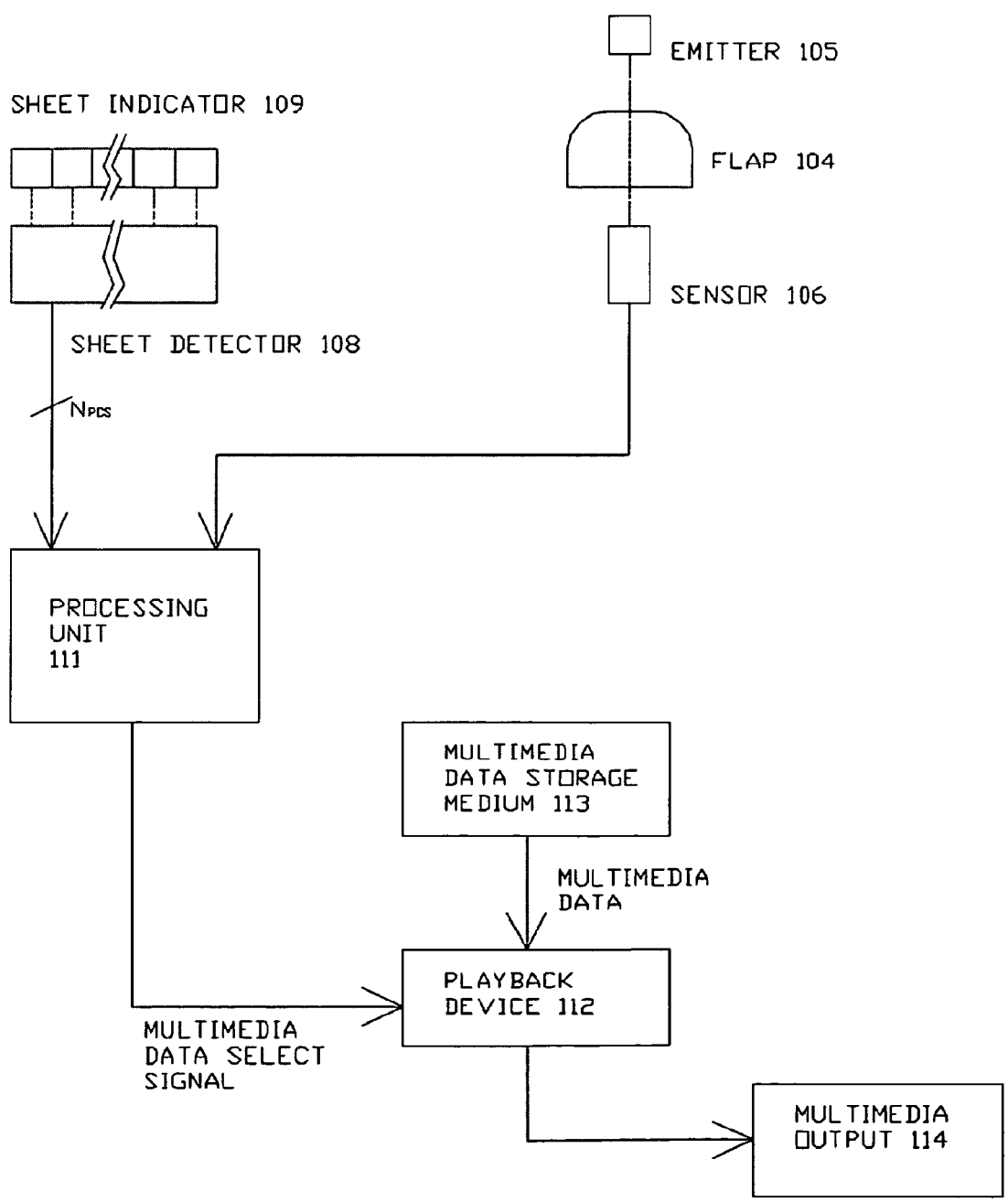
FIG. 3 illustrates an exemplary logical flowchart for the control of the single sheet, single flap reader, according to one embodiment.

FIGS. 1-3—Exemplary Single Sheet, Single Lift-the-Flap Reader

FIG. 1 illustrates an exemplary embodiment of a single sheet, single lift-the-flap interactive system or reader. As shown, a base unit 101 is shown which includes a housing with a substantially planar surface configured to accommodate a printed media sheet 102 from a plurality of interchangeable printed media sheets 103.

As also shown, each of the printed media sheets includes a lift-the-flap ("flap") element 104. In this case the flap element 104 is shown in a down position where it is parallel to the printed media sheet 102. As shown, the flap element 104 may have a printed image on its top portion (in this case, an image of an apple). FIG. 2 illustrates the flap 104 in the lifted position. As can be seen, the flap element 104 now extends upward in three dimensional space to reveal a surface 201 under the flap element 104. In this case the Spanish word for apple, 'manzano' is shown in the surface 201 under the flap element 104, revealing the answer to the question printed on the printed media sheet 102, "How do you say Apple en Español?". Similarly, the top most shown printed media sheet 103 illustrates "How do you say . . . " followed by a flap with a printed boat, with the text "boat" underneath, "en Español?".

In some embodiments, the base unit 101 may include a flap detector which may include an emitter 105 and a sensor 106. In one embodiment, the emitter 105 may radiate electromagnetic energy. The emitter may include, but is not limited to, visible-wavelength LEDs, infrared radiation (IR) emitting diodes, lasers, laser diodes, and incandescent lamps, among others for producing the electromagnetic energy. The detector 106 may produce an electronic signal in response to the reception of the electromagnetic energy from the emitter 105. For example, the sensor 106 may include, but is not limited to, visible-wavelength and infrared-wavelength photo-diodes, photo-transistors (photo-detectors), and photo-resistors, among others. The emitter 105 and sensor 106 may be arranged such that electromagnetic energy radiated by the emitter 105 passes over the surface of any printed-media sheet that is positioned on the base unit and is received by the sensor 106. A "beam" of electromagnetic energy 107 is shown in FIG. 1 traveling in a straight line from the emitter 105 to the sensor 106. As shown in FIG. 2, the beam 107 is interrupted by the lifted flap element 104.

The base unit may further include a printed media sheet detector ("sheet detector") 108, which may be used for detecting a code or pattern or other indicator 109 that identifies which sheet (in this case 102) of the plurality of interchangeable printed media sheets 103 is currently positioned upon the base unit. The sheet detector 108 may include mechanical switches which detect cutouts in the printed media pages, magnetic field detectors which detect an array of magnets embedded in the printed media sheets 103, a microchip embedded in the printed media sheet 103 which may be electrically or electromagnetically coupled to the processing unit, optical detectors which detect light through cutouts in the printed media sheets 103, optical detectors which detect light reflected from features printed upon the printed media sheets 103 (further details can be found in U.S. Pat. No. 4,884,974, which is hereby incorporated by reference as if set forth fully herein.), and/or using other methods for detecting the current printed sheet.

The base unit may include positioning elements 110 for mechanically positioning the current printed media page 102 upon the base unit 101 so that sheet detector 108 may accurately detect the current media sheet based on the sheet indicator 109.

The invention further comprises a processing unit 111 which may receive electronic signals from the flap detector and sheet detector and may produce a signal for multimedia playback device 112 to provide playback of media files. The playback device 112 may read multimedia data from an interchangeable data storage medium 113 which may store multimedia data corresponding to a single or a plurality of printed media sheets (102 and 103 respectively). In some embodiments, the interchangeable data storage medium may be an optical storage medium such as a CD or DVD. Alternatively, or additionally, the interchangeable data storage device may include a memory medium, which may be volatile or non-volatile, as desired. However, it should be noted that in some embodiments, the storage medium may not be interchangeable, but may be a static storage medium. In such embodiments, data may be provided or downloaded to the storage medium for storage (e.g., using a computer or by otherwise connecting the base, processing unit, or playback device to a network, for example).

The playback device 112 may produce output to a multimedia output, such as the speaker/display device 114 shown. Multimedia data playback may be provided to the user in response to various actions. For example, upon detection of the flap being lifted, multimedia data corresponding to the flap may be provided via the output 114. Additionally, multimedia data may be provided in response to a change of the media sheet 102, in response to various inputs (e.g., buttons) on the media sheet 102, the base 101, etc., and/or in response to other conditions, such as audio or visual interaction of the user (e.g., by detecting vocal or visual responses from the user).

Note while the various elements shown in FIG. 1 are portrayed external to the base 101 (such as the multimedia output 114, the processing unit 111, the playback device 112, etc.), one or more of these elements may be incorporated into the base unit. In one embodiment, the base unit may include all of the elements, and no external elements may be required.

Alternatively, or additionally, other features or external elements may also be coupled to the base 101. For example, in one embodiment, the base 101 may couple to a computer, e.g., as a peripheral, possibly for updating purposes or for a more interactive experience. In one embodiment, the base 101 may be a USB device. Additionally, the base 101 may be configured to couple to a computer or other device and make use of that device (or peripherals of that device) for playback or processing purposes (among other possibilities).

Alternatively, the sheet detector 108 and sheet indicator 109 could be functionally combined with the data storage medium 113. For example, the data storage medium may be a microchip attached to each of the printed media sheets 102 and 103. When the printed media sheet is correctly positioned upon the base unit 101, an electrical connection or electromagnetic coupling may be established between the data storage medium 113 and the processing unit 111. This connection or coupling may serve to identify the current page and also supply multimedia data.

As indicated above, FIG. 2 illustrates the same interactive system of FIG. 1, but includes the flap element 104 in a lifted position, revealing the surface 201 under the flap element 104. As also indicated above, in this configuration, the transmission of the beam of electromagnetic energy 107 between emitter 105 and detector 106 is blocked by the lifted flap. The resulting interruption of the electromagnetic energy beam may be detected as a change in the electronic signal from the flap detector. This signal change may then be used to trigger the playing of a multimedia data (e.g., a soundtrack) that is meant to correspond to the lifting of the flap (104). In other words, when the flap element 104 is lifted, multimedia data corresponding to the flap element 104 (e.g., in particular, the lifting of the flap element 104) may be played back for the user of the interactive system. Thus, the user is able to interact with the printed media sheet 102 using the flap element 104.

In this example, the printed media sheet 102 corresponds to a bilingual educational "flash-card", the sound track that would be played upon detection of the flap's (104) lifting would be to pronounce the word 'manzana', and perhaps to read a sentence in which the word is used in context. Thus, in this particular example, the visual appearance of the printed word 'manzana' would be enhanced by the audio track and would serve to reinforce the learning process. Additionally, an introductory sound track could also be played for each printed media sheet as it was loaded onto the base unit. Upon a successful identification of the printed media sheet using the indicator 109, the appropriate introductory sound track may be initiated. In this example, it could read the question, and perhaps after a pause, it could give a hint. Note that the above description is provided as an example only, and other printed media sheets, flap elements, multimedia data, and/or interaction methods are envisioned.

Alternatively, the emitter 105 and detector 106 could be replaced by a flap sensor comprising a single detector which would be configured to detect ambient light through a cutout in the under-flap surface 201.

FIG. 3 illustrates an exemplary logic flowchart of the control processing unit for the interactive system of FIGS. 1 and 2. As shown, the sheet indicator 109 may be detected by sheet detector 108 and provided to processing unit 111. Additionally, the flap 104 may interrupt the beam between emitter 105 and sensor 106, thereby producing a lifted flap indication provided to sheet and flap detection.

Accordingly, a multimedia data select signal may be provided to playback device 112, which may retrieve appropriate data from the multimedia data storage medium 113 to provide output data to the multimedia output 114.

Figure 4:
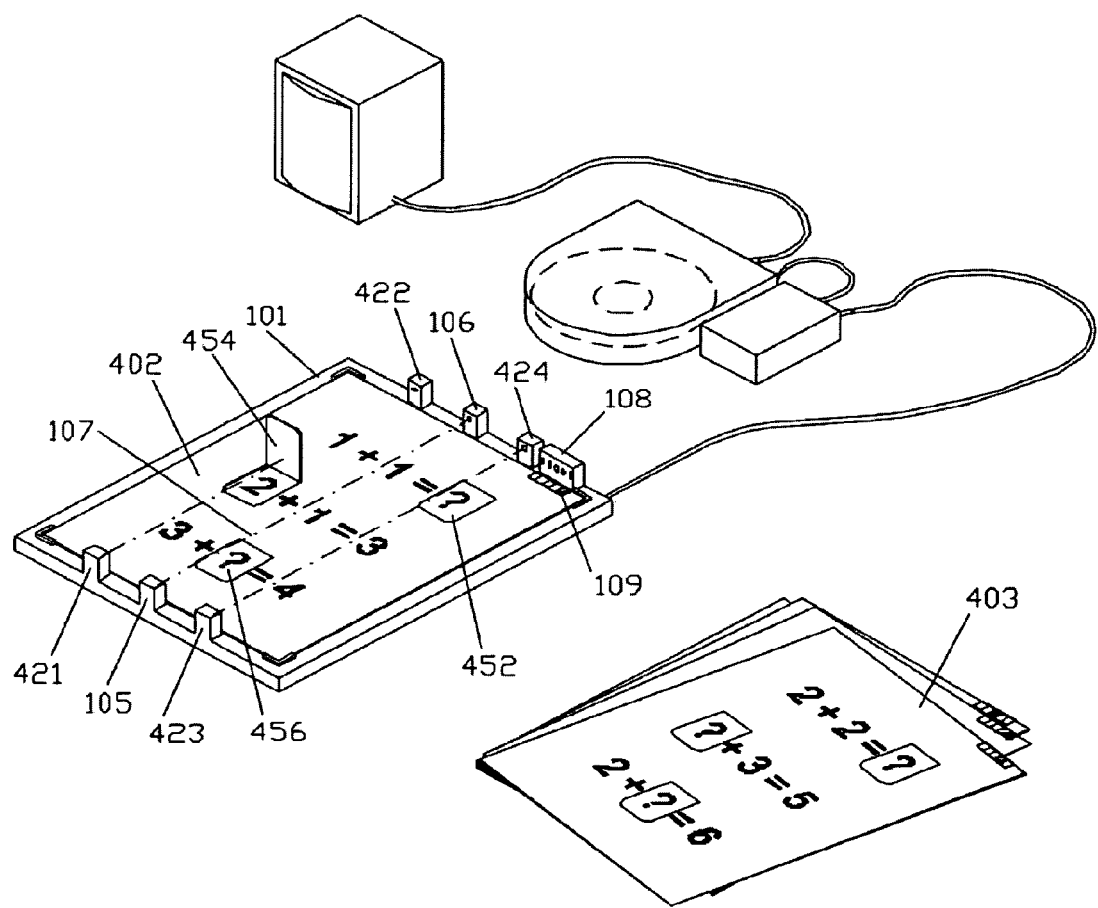
FIG. 4 illustrates an exemplary embodiment with a single sheet reader which may detect multiple flaps, according to one embodiment.
Figure 5:
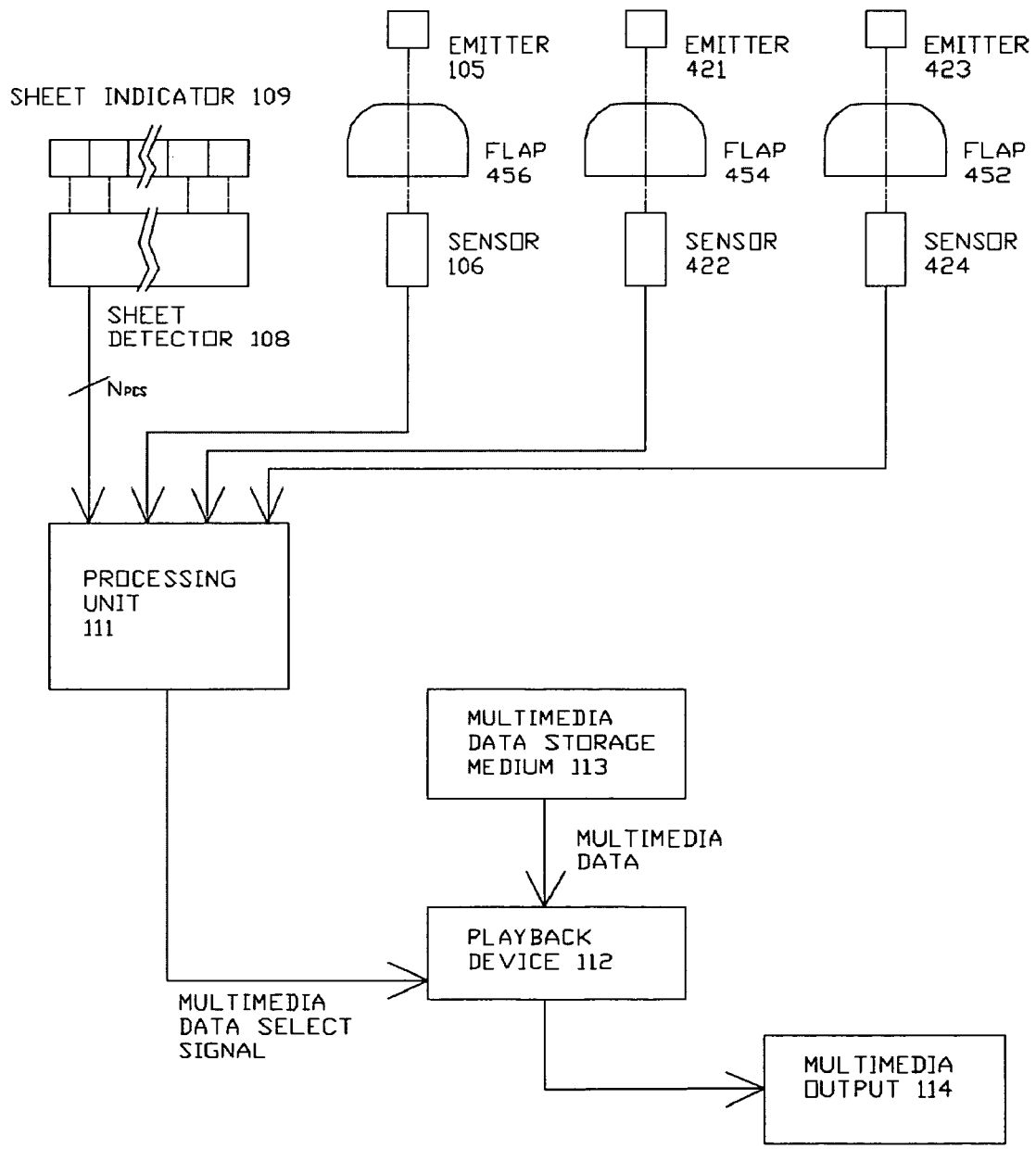
FIG. 5 illustrates an exemplary logical flowchart for the control of the single sheet, multiple flap reader, according to one embodiment.

FIGS. 4 and 5—Single Sheet with Multiple Flaps with Multiple Detectors

It is clear from the foregoing that flap detection could be extended by including additional sets of emitter/sensor pairs for detecting additional flaps as shown in FIG. 4. In this way, printed media pages with more than one flap element could be accommodated. The most basic embodiment of a multiple-flap system would utilize emitter/sensor pairs in a 1:1 ratio with the number of flaps that could be accommodated. Thus, a system that could accommodate three flaps/page would require three emitter/detector pairs.

More specifically, as shown in FIG. 4, in addition to emitter sensor pairs 105 and 106, additional pairs 421 and 422 and 423 and 424 may be used to detect flaps 456, 454, and 452 respectively. In this particular example, the printed media sheet 402 may have a first line "1+1=?" where the question mark is flap 452 which may be raised to reveal the number '2'. When sensor 424 detects an interruption of the beam, it may indicate that the flap 452 has been raised and that corresponding multimedia data (e.g., speaking the number 2) should be played back. As also shown lifted flap 454 is displayed in the first position of "2+1=3". In this case, the multimedia data for the number '2' may be played back according to the output of the detector 421 and 422. Finally, in the last portion of the printed media sheet the text "3+?=4" where the '?' is flap 454 which can be lifted to interrupt the beam 107 between 105 and 106 and reveal the text '1'. Similar to above, multimedia data corresponding to the text '1' may be played back for the user. Similarly, the top most shown printed media sheet 403 shows "2+2=?", "?+3=5", and "2+?=6" where each '?' is a flap and the set of flaps are in the same positions as the flaps of printed media sheet 402 (although that is not required since each emitter/sensor pair is distance agnostic in the shown embodiment). Note that other detection methods are envisioned which may be detect distances or location of the flap with respect to the printed media sheet.

FIG. 5 is an exemplary logical flow chart corresponding to FIG. 4 similar to FIG. 3, which was described above. As shown, the sheet indicator 109 may be detected by sheet detector 108 and provided to processing unit 111. Additionally, the flap 456 may interrupt the beam between emitter 105 and sensor 106, the flap 454 may interrupt the beam between emitter 422 and sensor 423, and/or the flap 452 may interrupt the beam between emitter 424 and sensor 426, thereby producing a lifted flap indication provided to sheet and flap detection. As shown, sheet and flap detection may detect beam interruption independently for each of the detectors.

Accordingly, a multimedia data select signal (which may vary depending on the detected sheet ID and the particular lifted flap) may be provided to playback device 112, which may retrieve appropriate data (e.g., the data corresponding to the detected media sheet and the particular lifted flap) from the multimedia data storage medium 113 to provide output data to the multimedia output 114.

Figure 6:
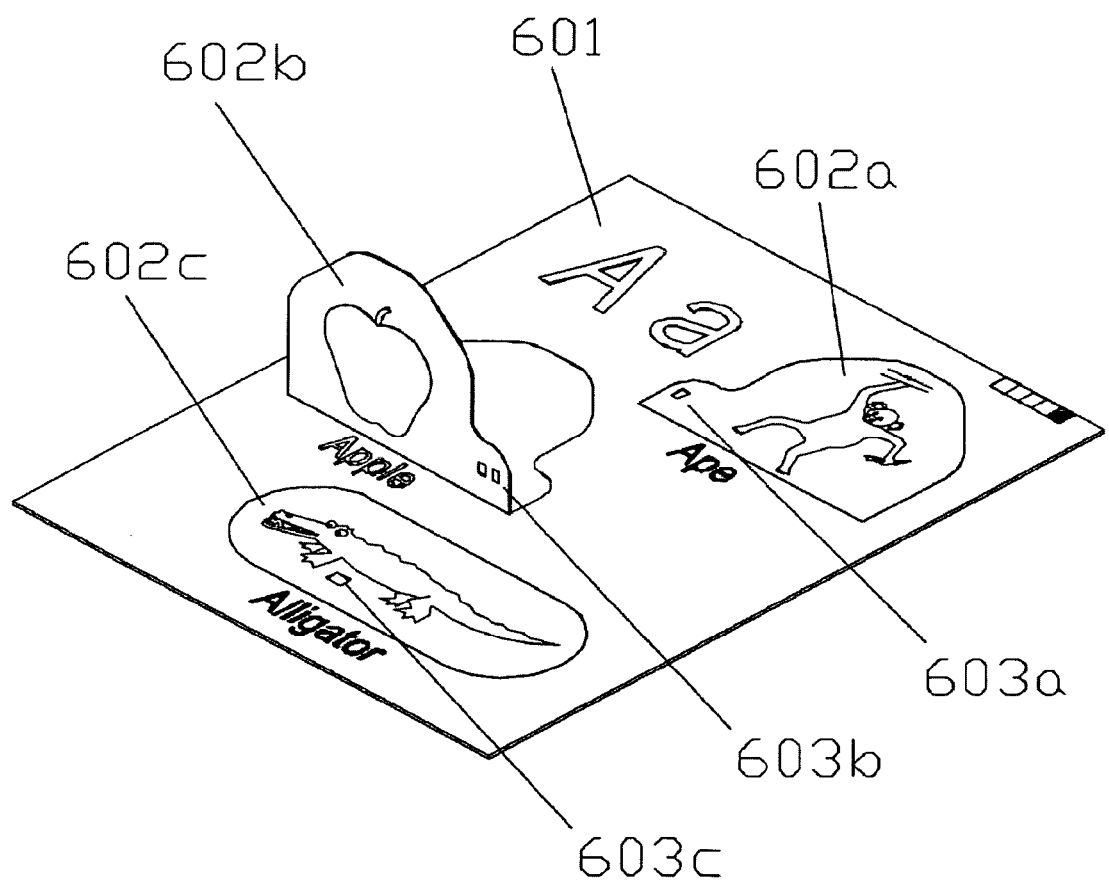
FIGS. 6 and 7 illustrate exemplary embodiments of printed media sheets with multiple flaps, according to one embodiment.
Figure 7:
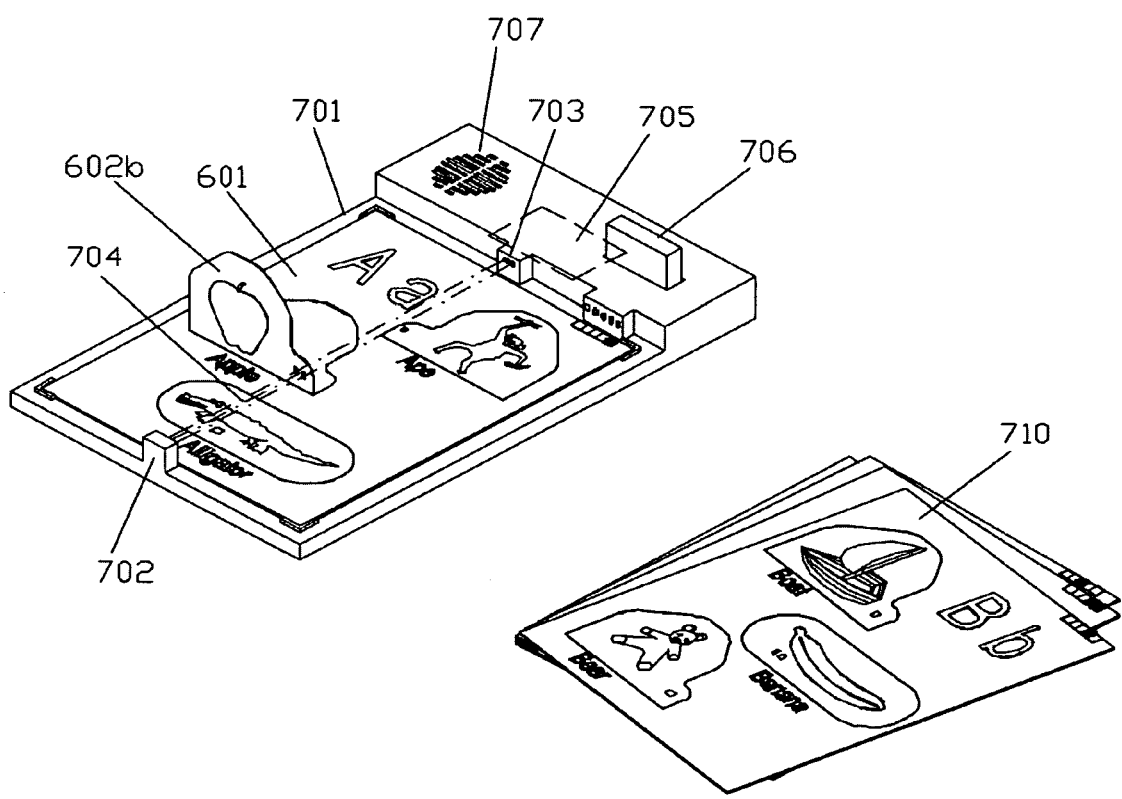
Figure 8:
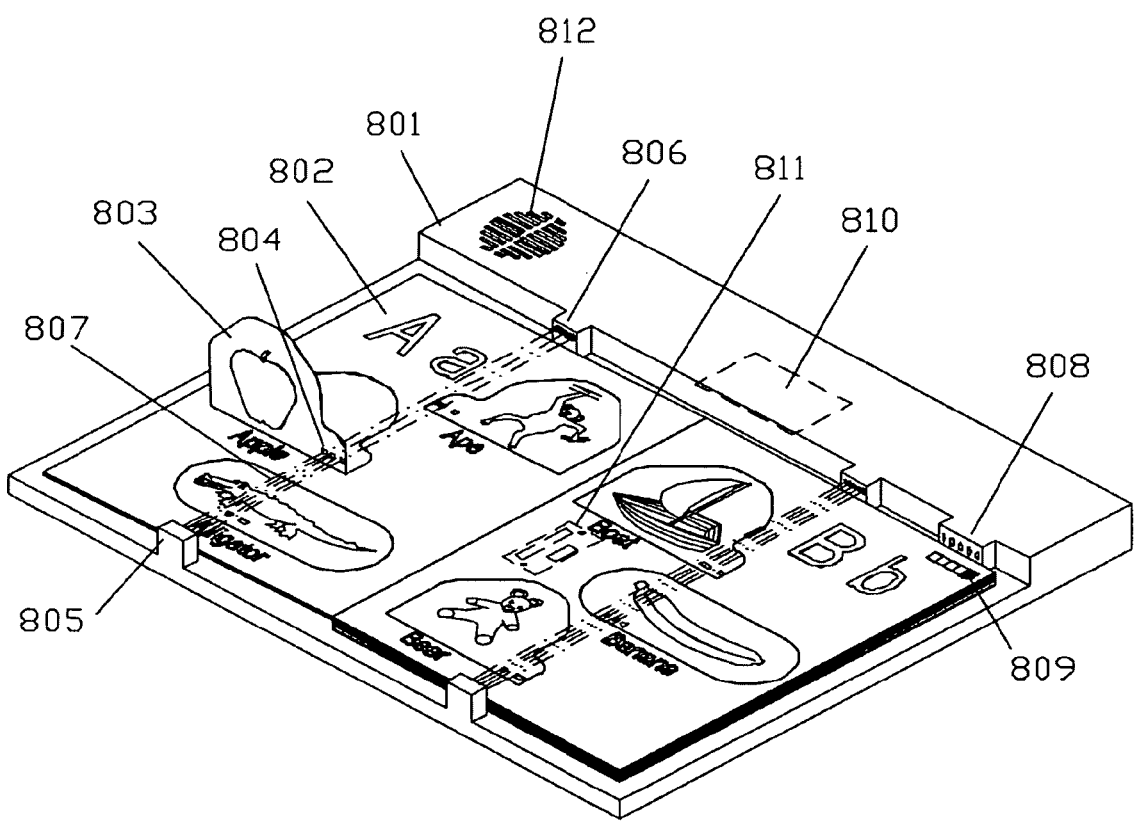
FIG. 8 illustrates an exemplary interactive book with multiple flaps, according to one embodiment.

FIG. 6-8—Multiple Flaps via One Detector

In one embodiment, the interactive system may employ encoded aperture patterns on the flaps. For example, FIG. 6 illustrates an exemplary printed media sheet 601 with multiple flaps. Each of the multiple flaps 602a-c on the printed sheet has a unique pattern of cut-out apertures (603a-c). Each flap is positioned such that the apertures may be aligned with the beams of electromagnetic energy that exists between each emitter/detector pair. In this way, $2^N-2$ flaps can be accommodated in a system with N emitter detector pairs. It is $2^N-2$ rather than $2^N$, because the code for all zeroes may be present when all flaps are in the down position and the code for all ones may be present when any flap is moving from down to up or vice versa, or when a hand or other object accidentally obstructs the beams.

FIG. 7 illustrates an embodiment that may interact with the multi-flap printed media page shown in FIG. 6. A base unit 701 is shown which may include a platform configured to accommodate the multi-flap printed media sheet 601 from a plurality of interchangeable multi-flap printed media sheets 710. The base unit may include a detector which may include N pairs of emitters 702 and sensors 703. The detector (e.g., each pair of N emitters) may produce an electronic signal in response to the reception of electromagnetic energy (or lack thereof). The detector (and in particular the emitters and sensors) may be arranged such that electromagnetic energy emitted by the emitter devices passes over the surface of any printed-media sheet that is positioned on the base unit and is detected by the corresponding detector device. An array of "beams" of electromagnetic energy 704 is shown traveling from the emitters to the detectors.

The invention further comprises an internal processing unit 705 which may read electronic signals from the flap-detector and sheet-detector, read corresponding multimedia data from interchangeable data storage device 706, and produce an output signal to a multimedia output (e.g., speaker and/or display device, depending on the nature of the output) 707. This embodiment shows the processing unit and speaker/display device integral to said base unit, and the data storage device as a removable ROM cartridge, but further embodiments are envisioned where one or more of these elements are external to the base unit. Additionally, the ROM cartridge could be any of a plurality of memory mediums, such as a CD, DVD, etc.

In the example shown, the detector may include 3 emitters, which may align in a 1:1 fashion with 3 sensors. Flap 602b has been lifted, and the pattern of the aperture on this flap is "open", "blocked", "open". Note that the beams of electromagnetic energy are blocked in the corresponding pattern, and that pattern can be registered electronically by the sensors. Thus, if the signal produced by the detector is logic "0" when the beam reaches the detector, the signal pattern registered in this example will be "010". Any pattern, in this example, of "001", "010", "011", "100", "101", or "110" would be valid flap identification codes. The pattern "000" may be reserved for no flaps up, and the pattern "111" may occur during flap motion and so would be reserved. Alternatively, or additionally, signals may only be produced from the detector, e.g., to the processing unit, only when an actual flap pattern is present (e.g., not when no flaps are listed). In one embodiment, the detector may produce signals on a periodic basis, e.g., every second, among other time intervals.

FIG. 8 illustrates an embodiment of an interactive book with flaps. As shown, base unit 801 may include a platform configured to accommodate an interchangeable printed interactive book 802, where each page of the interactive book may include multiple flaps 803 each containing a coded flap identifier 804. The base unit may also include multiple pairs of detectors 805 and 806. Each of the detectors may include a number "N" of emitters which may radiate electromagnetic energy. Each detector may include a corresponding number "N" of sensor which may produce an electronic signal in response to the reception of said electromagnetic energy (or upon lack of reception, or changes of values, or deviations from reception of all beams from the N emitters, among other possibilities). The emitter and sensor pairs may be arranged such that electromagnetic energy emitted by each emitter device passes over the surface of any printed-media sheet that is positioned on the base unit and is detected by the corresponding detector device. Multiple arrays of "beams" of electromagnetic energy 807 are shown, in FIG. 8, traveling from the emitters to the sensors. Note that the emitter and sensor pairs may be configured such that beams pass horizontally over the surface of both pages, or diagonally over the surface of either or both pages, instead of vertically as shown.

The base unit may additionally include a page detector (or set of sensors) 808 used for detecting a code 809 that identifies which page of the interchangeable printed media book is currently opened in the base unit. These codes (or another code, possibly detected by another detector) may also identify the current book, depending on the embodiment.

The base unit 801 may further include a combined processing and multimedia playback unit 810 which may receive electronic signals from the flap detector and the page detector to produce output to a multimedia output (e.g., a speaker and/or display device) 812. This embodiment shows various elements as residing internal to the base unit 801, but as indicated above, other variations and configurations are envisioned.

The playback device may include a data storage device 811 (e.g., an interchangeable data storage device) which may include multimedia data corresponding to a set of said printed media pages. In some embodiments, the data storage device may be attached to the interactive media book and act as a way to connect and align the interactive media book to the base unit. For example, the data storage device 811 shown in FIG. 8 may act as a connector positioned in the rear of the book which allows the user to plug the book into the interactive book base unit. Thus, by plugging in the book, multimedia data may be provided for the book (without having to keep track of both a book and a storage device associated with the book) and the book may be properly positioned in the base unit. In one embodiment, the storage device 811 may be keyed such that it can only be plugged in with the proper book orientation.

Note that similar flowcharts and descriptions of the previous FIGS. 1-5 may apply to the operation of the interactive book or printed media sheets of FIGS. 6-8

Figure 9:
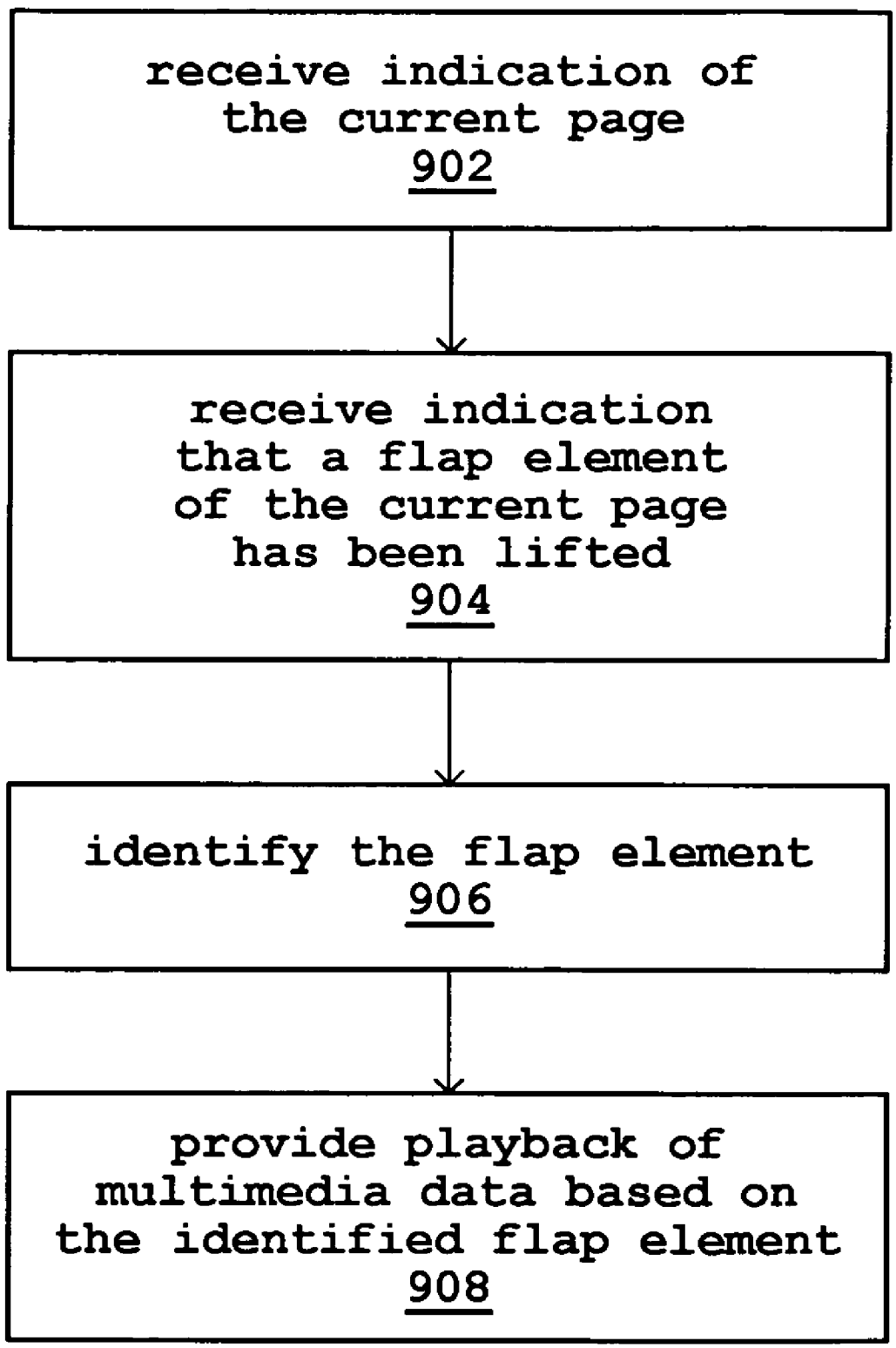
FIG. 9 is a flowchart illustrating a method for detecting lifted flaps in an Interactive Book.

FIG. 9—Exemplary Method for Detecting Lifted Flaps in an Interactive Book

FIG. 9 illustrates a method for detecting lifted flaps in a printed media sheet. The method shown in FIG. 9 may be used in conjunction with any of the processing units or devices shown in the above Figures, among other devices. In various embodiments, some of the method elements shown may be performed concurrently, performed in a different order than shown, or omitted. Additional method elements may also be performed as desired. As shown, this method may operate as follows.

In 902, an indication of the current page may be received (e.g., by a processing unit of the interactive book or base unit). In some embodiments, the current page may be in an interactive book (such as that one shown in FIG. 8, among other possibilities) which comprises a plurality of pages (e.g., the printed media sheets described above). Alternatively, the current page may be a single printed media sheet (e.g., similar to various descriptions above), such as a flashcard or instructional single printed media sheet. As already indicated above, the current page may include a single flap element, a plurality of flap elements (e.g., for a plurality of detectors), a plurality of flap elements for a single detector, and/or a plurality of flap elements for a plurality of detectors where each detector may be able to detect more than one flap element.

In some embodiments, the indication of the current page may be received from a detector, which may detect an indicator printed or included in the current page. For example, the current page may have a printed bar code that can be scanned, may include an RFID or other electronic indicator that may be read (e.g., via inductive means), may have a particular cut out pattern, or may have some other indication. Correspondingly, when the current page is properly placed (e.g., in a base unit), the detector may identify the current page and provide that indication to a processing unit, for example. Alternatively, the user may pass the current page under a scanner (e.g., to scan the bar code or cut out pattern) and then begin using the current page. In another embodiment, the user may enter in a page ID or otherwise indicate the current page.

The indication of the current page may also identify the book that the current page resides in (in the case that the current page is part of an interactive book). Alternatively, an identification of the book may be provided separately, e.g., via another detector. The various methods for identifying the current page could also be used to identify the interactive book, among other methods.

In 904, second input indicating that a flap element of the current page has been lifted may be received. In one embodiment, the lifting of the flap element may be detected by a detector that includes an emitter and a sensor, where the flap element interrupts a beam of energy between the emitter and sensor when lifted. As also indicated above, the detector may include a plurality of emitters and sensors, and the flap element may include an aperture that uniquely identifies the flap element among other flap elements that may interrupt the beam(s) of the detector. Accordingly, the detector (and/or a processing unit receiving signals from the detector) may be able to uniquely identify or distinguish the flap element based on the particular interruption of beams between the plurality of emitters and sensors of the detector.

However, other methods of detection are envisioned other than those using emitters and detectors or interruption of beams. For instance, the flaps may be detected by sensing light or other electromagnetic wave energy reflected from the lifted flap. In this case, the detector may distinguish between different flaps by sensing the distance to each flap from measurement of the reflected power, or by triangulation, or there could be separate sets of emitters and reflection detectors for each flap location. Alternatively or additionally, sound or ultrasound emitters and detectors could be used, either in blocking transmission mode or in reflection mode via echolocation. Alternatively or additionally, each flap may have an embedded microchip that is electromagnetically coupled to the base unit via an RF antenna. When the flap is down, the chip may be within range of the RF antenna in the base unit. When lifted, the chip may move out of range of the RF antenna and its change in position may thus be detected. Alternatively, or additionally, each flap could have an embedded magnet which could be detected by a magnetic switch or magnetic field sensor in the base unit. When the flap is down, the magnet may be detected, and when the flap is up, the magnet may no longer be detected.

The detector may then provide a signal that indicates the flap element has been lifted. In simple embodiments where the detector only detects a single flap element, the signal may be extremely simple, such as a trigger. However, where there are a plurality of possible flap elements (detected by the detector or by a plurality of detectors) the signal may uniquely identify the detector itself and/or the flap element using a bit code. The indication may be received by a processing unit of the interactive book or base unit.

In 906, the flap element may be identified. As indicated above, the identification may be performed by the detector and/or the processing unit. In one embodiment, the processing unit receives a signal from the detector with a bit code and identifies the flap element based on the bit code. In simpler embodiments (e.g., where only a single flap element is present) identification may not be necessary as only a trigger may be received.

In some embodiments, the identification of the flap element may be based on the current book (if it is a book), the current page, the detector that detected the flap element, and/or the bit code of the flap element, depending on the complexity of the system. For example, where different books (e.g., each with a plurality of pages, and each page with a plurality of flap elements) may be placed in the interactive system/base unit, all the information above may be required. However, in single sheet embodiments, embodiments where there are not a plurality of flap elements, and/or embodiments where there are not a plurality of detectors, all of the information above may not be required and only subsets may be necessary.

In 908, playback of multimedia data may be provided based on the identified flap element. In one embodiment, the multimedia data may be stored on a memory medium such as a hard drive, non-volatile media, etc. or may be stored on a removable memory medium such as a thumb drive, CD, DVD, etc. The removable memory medium may correspond to the particular book or set of sheets. In such cases, the identification of the flap element may only require the identification of the particular printed sheet and the identification of the flap element (if more than one flap element is on each printed sheet). Alternatively, the memory medium (removable or not) may store multimedia data for a plurality of books or printed media sheets, and the identification of the book and/or sheet may be required to uniquely identify the flap. However, it may be possible to uniquely identify each flap without the use of identification of the particular book and/or sheet, as desired. Thus, varying degrees of identification of the detector which detected the lifted flap, the current printed page or sheet, the current book, and the lifted flap may be required to correctly identify the proper multimedia data for playback.

Correspondingly, the multimedia data corresponding to the lifted flap may be played back for the user. This may be achieved by the processing unit providing signals to a playback device to retrieve and play back the appropriate multimedia data. The multimedia data (e.g., audio and/or video data) may be provided via a multimedia output (e.g., a speaker for audio data and/or a display for video data). In some embodiments, the multimedia data may be encoded according to a codec, and the processing unit (or other processing logic) may decode the multimedia data into audio and/or video signals for playback.

The method may further include receiving further input corresponding to a second flap element being lifted, identifying the second flap element, and providing appropriate playback of second multimedia data that is different from the multimedia data corresponding to the identified flap element in 906. Similarly, the method may further include receiving input indicating a second page of the interactive book (or a different printed media sheet), fourth input identifying another flap element, identification of the other flap element, and playback of multimedia data corresponding to the other flap element.

Although the embodiments above have been described in considerable detail, numerous variations and modifications will become apparent to those skilled in the art once the above disclosure is fully appreciated. It is intended that the following claims be interpreted to embrace all such variations and modifications.

We claim:
1. An interactive system, comprising:
a housing which forms a substantially planar surface configured to support at least one printed media sheet, wherein the at least one printed media sheet comprises at least one lift-the-flap element;

a playback device configured to provide multimedia data relating to the at least one lift-the-flap element of the at least one printed media sheet;

a detector which is configured to detect a position of the at least one lift-the-flap element and provide position information;

a processing unit coupled to the playback device and the detector, wherein the processing unit is configured to cause playback of the multimedia data via the playback device based on the position information provided by the detector, wherein the detector is configured to provide a first indication of when the at least one lift-the-flap element is lifted, and wherein the processing unit is configured to cause playback of the multimedia data via the playback device in response to the first indication; and wherein the detector is further configured to provide a second indication of when the at least one lift-the-flap element is returned to a substantially planar orientation with respect to the at least one printed media sheet, and wherein the processing unit is further configured to alter playback of the multimedia data in response to the second indication.

2. The interactive system of claim 1, wherein the at least one lift-the-flap element comprises a plurality of lift-the-flap elements, wherein the detector is configured to provide position information for each of the plurality of lift-the-flap elements, wherein the multimedia data comprises multimedia data for each of the plurality of lift-the-flap elements, and wherein the processing unit is configured to cause playback of the respective multimedia data based on position information of the respective lift-the-flap element.

3. The interactive system of claim 1, wherein each of the plurality of lift-the-flap elements comprise a different aperture for identification, wherein the detector is configured to detect the different aperture to identify the respective lift-the-flap element.

4. The interactive system of claim 1, further comprising:
a plurality of additional detectors, each configured to detect position of additional lift-the-flap elements;
wherein the processing unit is configured to provide playback of different multimedia data for each respective lift-the-flap element via the playback device.

5. The interactive system of claim 1, wherein the detector comprises an electromagnetic wave emitter and an electromagnetic wave sensor mounted in the housing such that a beam of electromagnetic energy exists in a line from the emitter to the sensor and such that the beam is interrupted when the at least one lift-the-flap elements is moved to a lifted position, and wherein the detector is configured to provide the position information based on beam interruption.

6. The interactive system of claim 1, wherein the at least one media sheet comprises a plurality of different media sheets, wherein each media sheet comprises a different identifier, and wherein the processing unit is configured to receive an indication of the identifier of the respective media sheet and provide corresponding playback for the respective lift-the-flap elements of the respective media sheet.

7. The interactive system of claim 1, wherein the multimedia data comprises audio data, and wherein the system comprises a speaker coupled to the playback device.

8. The interactive system of claim 1, wherein the multimedia data comprises video data, and wherein the system comprises a display coupled to the playback device.

9. The interactive system of claim 1, wherein a surface under the at least one lift-the-flap element comprises an image and/or text, wherein the multimedia data corresponds to the image and/or text.

10. A method for operating an interactive system, comprising:
a device receiving first input indicating a current page of a plurality of pages;
the device receiving second input indicating that a lift-the-flap element of the current page has been lifted;
the device providing playback of multimedia data based on said receiving the first and second input;
the device receiving third input indicating that the lift-the-flap element of the current page has been returned to a substantially planar orientation with respect to the current page; and
the device ceasing playback of the multimedia data in response to the third input.

11. The method of claim 10, wherein the current page comprises a plurality of lift-the-flap elements.

12. The method of claim 10, further comprising:
receiving fourth input indicating that a second lift-the-flap element of the current page has been lifted;
identifying the second lift-the-flap element; and
providing playback of second multimedia data based on said receiving the fourth input, wherein the playback of the second multimedia data corresponds to the identified second lift-the-flap element.

13. The method of claim 10, further comprising:
receiving fourth input indicating a second page of the plurality of pages;
receiving fifth input indicating that a second lift-the-flap element of the second page has been lifted;
identifying the second lift-the-flap element; and
providing playback of second multimedia data based on said receiving the fifth input, wherein the playback of the second multimedia data corresponds to the identified second lift-the-flap element.

14. The method of claim 10, wherein said identifying the lift-the-flap element comprises identifying the lift-the-flap element based on an aperture of the lift-the-flap element.

15. The method of claim 10, further comprising:
detecting that the lift-the-flap element of the current page has been lifted, wherein said detecting comprises detecting that a beam of electromagnetic energy has been interrupted.

16. An interactive book, comprising:
a housing which forms a substantially planar surface configured to support a plurality of printed media sheets, wherein each printed media sheet comprises at least one lift-the-flap element;
a playback device configured to provide audio data relating to the at least one lift-the-flap element of the at least one printed media sheet;
a memory medium which stores audio data relating to the at least one lift-the-flap element of the at least one printed media sheet;
an audio output configured to output the audio data stored on the memory medium;
a printed media sheet detector, wherein the printed media sheet detector is configured to detect a current media sheet and provide an indication of the current media sheet;
a lift-the-flap element detector which is configured to:
detect a position of the at least one lift-the-flap element of the current media sheet:

provide a first indication of when the at least one lift-the-flap element is lifted;

provide a second indication of when the at least one lift-the-flap element is lowered;

a processing unit coupled to the memory medium, the output, and the detector, wherein the processing unit is configured to:

cause playback of the audio data corresponding to the at least one lift-the-flap element of the current media sheet via the audio output based on the indication of the current media sheet and the first indication of when the at least one lift-the-flap element is lifted; and cease playback of the audio data corresponding to the at least one lift-the-flap element of the current media sheet based on the second indication of when the at least on lift-the-flap element is returned to a substantially planar orientation with respect to the current media sheet.

17. The interactive book of claim 16, wherein the at least one lift-the-flap element comprises a plurality of lift-the-flap elements, wherein the detector is configured to provide indications of when each of the plurality of lift-the-flap elements is lifted, wherein the audio data comprises audio data for each of the plurality of lift-the-flap elements, and wherein the processing unit is configured to cause playback of the respective audio data based on the first indication of the respective lift-the-flap element.

18. The interactive book of claim 17, wherein each of the plurality of lift-the-flap elements comprise a different aperture for identification, wherein the detector is configured to detect the different aperture to identify the respective lift-the-flap element.

19. The interactive book of claim 16, further comprising:

a plurality of additional detectors, each configured to detect position of additional lift-the-flap elements;

wherein the processing unit is configured to provide playback of different audio data from the memory medium for each respective lift-the-flap element via the audio output.

20. The interactive book of claim 16, wherein the detector comprises an electromagnetic wave emitter and an electromagnetic wave detector mounted in the housing such that a beam of electromagnetic energy exists in a line from the emitter to the detector and such that the beam is interrupted when the at least one lift-the-flap elements is moved to a lifted position, and wherein the detector is configured to provide the first indication based on beam interruption.

21. The interactive book of claim 16, wherein a surface under the at least one lift-the-flap element comprises an image and/or text, wherein the audio data corresponds to the image and/or text.

* * * * *

UNITED STATES PATENT AND TRADEMARK OFFICE
CERTIFICATE OF CORRECTION

PATENT NO.        : 8,041,289 B2
APPLICATION NO.   : 12/117035
DATED             : October 18, 2011
INVENTOR(S)       : Kerwick et al.

It is certified that error appears in the above-identified patent and that said Letters Patent is hereby corrected as shown below:

In the Claims:

Column 13
Line 11, please delete "detector," and substitute --detector;--.

Column 14
Line 67, please delete "of the current media sheet:" and substitute --of the current media sheet;--.

Signed and Sealed this
Third Day of January, 2012

David J. Kappos
*Director of the United States Patent and Trademark Office*